(12) United States Patent
Uchida et al.

(10) Patent No.: US 11,898,077 B2
(45) Date of Patent: Feb. 13, 2024

(54) COMPOSITION AND METHOD FOR PRODUCING SAME

(71) Applicant: Kureha Corporation, Tokyo (JP)

(72) Inventors: Junya Uchida, Tokyo (JP); Takumi Katsurao, Tokyo (JP); Hiroshi Sakabe, Tokyo (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 17/999,493

(22) PCT Filed: Feb. 12, 2021

(86) PCT No.: PCT/JP2021/005144
§ 371 (c)(1),
(2) Date: Nov. 21, 2022

(87) PCT Pub. No.: WO2021/235025
PCT Pub. Date: Nov. 24, 2021

(65) Prior Publication Data
US 2023/0137287 A1    May 4, 2023

(30) Foreign Application Priority Data
May 21, 2020    (JP) ................ 2020-088999

(51) Int. Cl.
*C09K 11/70* (2006.01)
*C09K 11/65* (2006.01)
*C09K 11/02* (2006.01)
*B82Y 30/00* (2011.01)
*B82Y 40/00* (2011.01)

(52) U.S. Cl.
CPC ........... *C09K 11/70* (2013.01); *B82Y 30/00* (2013.01); *B82Y 40/00* (2013.01)

(58) Field of Classification Search
CPC ..... C09K 11/025; C09K 11/06; C09K 11/065; C09K 11/70
See application file for complete search history.

(56) References Cited

U.S. PATENT DOCUMENTS

2008/0160232 A1\*    7/2008    Sasaguri .............. B41M 5/52
428/32.33
2016/0160060 A1    6/2016    Kikuchi et al.

FOREIGN PATENT DOCUMENTS

| CN | 103788402 A | 5/2014 |
| CN | 104987863 A | 10/2015 |
| CN | 105862057 A | 8/2016 |
| CN | 105950145 A | 9/2016 |
| CN | 106315558 A | 1/2017 |

(Continued)

OTHER PUBLICATIONS

Devisetti. Nutrients and antinutrients in foxtail and proso millet milled fractions: Evaluation of their flour functionality. LWT—Food Science and Technology 59 (2014) 889-895 (Year: 2014).\*

(Continued)

*Primary Examiner* — Matthew E. Hoban
(74) *Attorney, Agent, or Firm* — Abel Schillinger, LLP

(57) ABSTRACT

An object is to provide a composition that contains a phosphorus-containing carbon quantum dot and can efficiently emit relatively long wavelength light. The composition to achieve the above object contains: a phosphorus-containing carbon quantum dot containing phosphorus as a heteroatom; and a smectite.

2 Claims, 1 Drawing Sheet

(56) References Cited

FOREIGN PATENT DOCUMENTS

| CN | 106318388 | A |   | 1/2017 |
|----|-----------|---|---|--------|
| CN | 106318391 | A |   | 1/2017 |
| CN | 106335893 | A |   | 1/2017 |
| CN | 106938840 | A |   | 7/2017 |
| CN | 107129804 | A |   | 9/2017 |
| CN | 107312533 | A |   | 11/2017 |
| CN | 108865124 | A |   | 11/2018 |
| CN | 108951280 |   | * | 12/2018 |
| CN | 109054820 | A |   | 12/2018 |
| JP | 2015214604 | A |   | 12/2015 |

OTHER PUBLICATIONS

Chen. Foxtail millet-derived highly fluorescent multi-heteroatom doped carbon quantum dots towards fluorescent inks and smart nanosensors for selective ion detection. New J. Chem., 2018, 42, 7326 (Year: 2018).*
Gong. Low temperature synthesis of phosphorous and nitrogen co-doped yellow fluorescent carbon dots for sensing and bioimaging. J. Mater. Chem. B, 2015, 3, 6813 (Year: 2015).*
Wang. Sulfur and phosphorus co-doped graphene quantum dots for fluorescent monitoring of nitrite in pickles. SpectrochimicaActaPartA:MolecularandBiomolecularSpectroscopy221(2019)117211 (Year: 2019).*
Office Action for JP Application No. 2022-524888, dated Jul. 12, 2022, 3 pages.
English translation of Office Action for JP Application No. 2022-524888, dated Jul. 12, 2022, 3 pages.
Office Action for JP Application No. 2022-524888, dated Oct. 4, 2022, 3 pages.
English translation of Office Action for JP Application No. 2022-524888, dated Oct. 4, 2022, 3 pages.
Office Action Issued for Application No. 110114072, dated Sep. 28, 2021.
Office Action Issued for Application No. 110114072, dated Feb. 22, 2022.
English translation of the International Preliminary Report on Patentability for PCT/JP2021/005144, dated Nov. 17, 2022, 4 pages.
Office Action for CN Application No. 202180030146.9, dated Feb. 24, 2023, 9 pages.
English translation of Office Action for CN Application No. 202180030146.9, dated Feb. 24, 2023, 10 pages.
Office Action for CN202180030146.9, dated Aug. 26, 2023, 6 pages.
English translation of the Office Action for CN202180030146.9, dated Aug. 26, 2023, 10 pages.
Office Action for TW110114072, dated Oct. 3, 2023, 3 pages.
English translation of the Office Action for TW110114072, dated Oct. 3, 2023, 3 pages.
Office Action for CN202180030146.9, dated Nov. 29, 2023, 4 pages.
English translation of the Office Action for CN202180030146.9, dated Nov. 29, 2023, 8 pages.

* cited by examiner

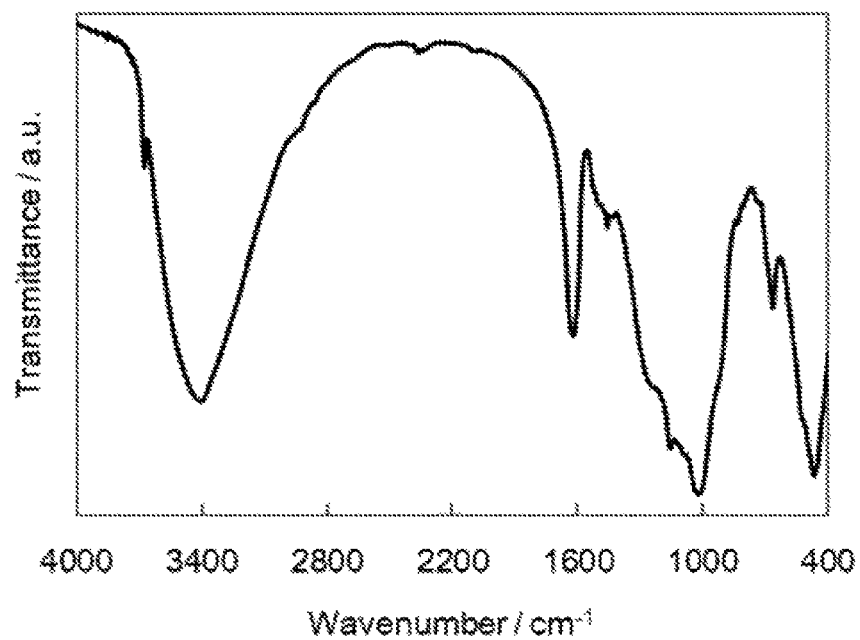

COMPOSITION AND METHOD FOR PRODUCING SAME

TECHNICAL FIELD

The present invention relates to a composition containing a phosphorus-containing carbon quantum dot containing phosphorus as a heteroatom and a method of producing the same.

BACKGROUND ART

Carbon quantum dots are stable carbon-based nanoparticles with a particle size of approximately a few nm to several tens of nm. Carbon quantum dots exhibit good fluorescence properties and thus are expected to be used as photonics materials, such as those of solar cells, displays, and security inks. In addition, carbon quantum dots have low toxicity and high biocompatibility and thus are also expected to be applied to medical fields, such as bioimaging.

To impart various functions to carbon quantum dots, phosphorus-containing carbon quantum dots in which a carbon quantum dot is doped with phosphorus and the like have been proposed in the art. For example, Patent Document 1 describes a biosensor using a phosphorus-containing carbon quantum dot, and Patent Document 2 describes a free radical scavenger. In addition, Patent Document 3 describes a metal ion sensor. Furthermore, Patent Document 4 describes a method of producing a phosphorus-containing carbon quantum dot in an aqueous solution.

CITATION LIST

Patent Document

Patent Document 1: CN 105950145 A
Patent Document 2: CN 105862057 A
Patent Document 3: CN 108865124 A
Patent Document 4: CN 106335893 A

SUMMARY OF INVENTION

Technical Problem

In recent years, carbon quantum dots that emit light with wavelengths in the visible to near-infrared region have been developed. Such carbon quantum dots can impart color rendering properties to lighting devices using their emission wavelengths and can be used in medical applications using their biopermeability. However, the emission efficiency of carbon quantum dots in the long wavelength region tends to be lower than the emission efficiency in the short wavelength region.

In addition, for example, the phosphorus-containing carbon quantum dots described in Patent Documents 1 to 4 and compositions containing these phosphorus-containing carbon quantum dots have problems in that aggregation is likely to occur, and the emission efficiency is likely to decrease.

The present invention has been made in view of the above problems. An object of the present application is to provide a composition that contains a phosphorus-containing carbon quantum dot and can efficiently emit relatively long wavelength light.

Solution to Problem

The present invention provides the following composition:
a composition containing:
a phosphorus-containing carbon quantum dot containing phosphorus as a heteroatom; and
a smectite.

The present invention also provides the following method of producing a composition:
a method of producing a composition, the method including:
preparing a mixture of an organic compound having a reactive group, a phosphorus compound, and a smectite; and
heating the mixture to obtain a composition containing:
a phosphorus-containing carbon quantum dot containing phosphorus as a heteroatom, and
a smectite.

The present invention also provides the following method of producing a composition:
a method of producing a composition, the method including:
preparing a mixture of an organic compound having a reactive group and a phosphorus compound;
heating the mixture to obtain a phosphorus-containing carbon quantum dot containing phosphorus as a heteroatom, and
mixing the phosphorus-containing carbon quantum dot and a smectite.

Advantageous Effects of Invention

The composition according to an embodiment of the present invention contains a phosphorus-containing carbon quantum dot and can efficiently emit relatively long wavelength light. Thus, the composition can be used in various applications, such as lighting applications and medical applications.

BRIEF DESCRIPTION OF THE DRAWINGS

FIG. 1 is a graph showing an infrared absorption spectrum of a composition prepared in Example 3.

DESCRIPTION OF EMBODIMENTS

In the present specification, numerical ranges indicated by "to" refer to numerical ranges including the numerical values described before and after "to".

A composition according to an embodiment of the present invention contains:
a phosphorus-containing carbon quantum dot containing phosphorus as a heteroatom; and
a smectite. In the present specification, the phosphorus-containing carbon quantum dot refers to a quantum dot containing mainly carbon and having a particle size of 1 to 100 nm, in which a part of the carbon chain or carbon ring in the quantum dot is substituted by phosphorus. The presence or absence of the phosphorus can be determined, for example, by Fourier transform infrared spectroscopy (FT/IR) or X-ray photoelectron spectroscopy (XPS).

As described above, carbon quantum dots in the art and compositions containing these carbon quantum dot have difficulty in emitting light in a relatively long wavelength region with a high emission quantum yield (fluorescence quantum yield). In contrast to this, the composition according to an embodiment of the present invention can provide relatively long wavelength emission and further can increase its emission quantum yield. The reason for this is uncertain but is presumed as follows.

When a phosphorus atom is contained as a heteroatom in the carbon quantum dot, orbital interaction occurs between the phosphorus atom and the π-conjugated site of the carbon quantum dot. The orbital interaction is then presumed to stabilize the lowest unoccupied molecular orbital (LUMO), reduce the band gap of the quantum dot, and provide relatively long wavelength emission. However, the effect is difficult to maintain with the carbon quantum dot merely containing phosphorus. Thus, in an embodiment of the present invention, the phosphorus-containing carbon quantum dot is combined with a smectite, which has ions between the layers. Combining these allows the phosphorus-containing carbon quantum dots to be locally arranged between the layers of the smectite and is likely to lengthen the emission wavelength due to the orbital interaction described above.

Furthermore, mixing the phosphorus-containing carbon quantum dot and the smectite maintains a state where the phosphorus-containing carbon quantum dot and the smectite are interacted, that is, a state where the phosphorus-containing carbon quantum dot is finely dispersed in the composition. As a result, the phosphorus-containing carbon quantum dot is presumed to be less likely to aggregate in the composition and have increased emission quantum yield.

Here, the composition according to an embodiment of the present invention contains a phosphorus-containing carbon quantum dot and a smectite. For example, the composition may be a composition in a solid state containing a phosphorus-containing carbon quantum dot and a smectite or may be a composition in a liquid state further containing a solvent or the like. Here, the solid state or liquid state refers to the state of the composition at 25° C. and 1 atm. Here, the composition may further contain a surfactant to enhance dispersibility, an emitting body other than the phosphorus-containing carbon quantum dot, or the like in a range that does not impair the object and effects of the present invention.

Phosphorus-Containing Carbon Quantum Dot

The phosphorus-containing carbon quantum dot is a compound containing a phosphorus atom as a heteroatom in a carbon quantum dot. The amount of phosphorus atoms contained in the phosphorus-containing carbon quantum dot is preferably from 1 to 35 mass % and more preferably from 2 to 25 mass % relative to the amount of all atoms in the phosphorus-containing carbon quantum dot. With the amount of phosphorus atoms in the above range, the maximum emission wavelength of the phosphorus-containing carbon quantum dot is likely to lengthen. The amount of phosphorus atoms in the phosphorus-containing carbon quantum dot can be determined by X-ray photoelectron spectroscopy. In addition, the amount of phosphorus atoms can be adjusted by the ratio of a phosphorus-containing compound (phosphorus source) and an organic compound (carbon source) used in the production of the phosphorus-containing carbon quantum dot or the like. The method for preparing the phosphorus-containing carbon quantum dot will be described in detail later.

The phosphorus-containing carbon quantum dot may further contain, as a heteroatom, an atom other than a phosphorus atom. Examples of the heteroatom other than the phosphorus atom contained in the phosphorus-containing carbon quantum dot include a nitrogen atom, a boron atom, a sulfur atom, a silicon atom, and a fluorine atom. The phosphorus-containing carbon quantum dot may contain only one of these or may contain two or more of these.

The heteroatom other than a phosphorus atom can be introduced by mixing a compound containing an element of these with a phosphorus compound and an organic compound and heating them together when the phosphorus-containing carbon quantum dot is prepared. In addition, a compound containing an element of these may be used as the organic compound or the phosphorus compound.

The amount of heteroatom other than the phosphorus atom in the phosphorus-containing carbon quantum dot is preferably from 1 to 100 mol % and more preferably from 20 to 70 mol % relative to the amount of phosphorus atoms in the phosphorus-containing carbon quantum dot. The phosphorus-containing carbon quantum dot containing a heteroatom other than the phosphorus atom in the above range enables adjustment of its emission wavelength or the like to a desired range. The amount of heteroatom other than the phosphorus atom can be determined by X-ray photoelectron spectroscopy. The amount of heteroatom other than the phosphorus atom can be adjusted by the amount of the compound used in the production of the phosphorus-containing carbon quantum dot.

Here, the phosphorus-containing carbon quantum dot preferably has a surface functional group, and the surface functional group preferably has a structure derived from at least one compound selected from the group consisting of phosphonic acid, phosphinic acid, phosphoric acid esters, phosphonic acid esters, and phosphinic acid esters.

A surface functional group of these contained in the phosphorus-containing carbon quantum dot allows the phosphorus-containing carbon quantum dot and in turn the composition to have good dispersibility in a solvent or the like and facilitates the use in various applications. The type of surface functional group contained in the phosphorus-containing carbon quantum dot can be identified, for example, by an IR spectrum. In addition, the surface functional group contained in the phosphorus-containing carbon quantum dot is derived from the structure of the phosphorus compound or the structure of the organic compound used in the preparation of the phosphorus-containing carbon quantum dot. The surface functional group can be selected by appropriate selection of these.

Here, the emission wavelength of the phosphorus-containing carbon quantum dot is not particularly limited, but the maximum emission wavelength is preferably from 450 to 750 nm and more preferably from 550 to 700 nm. The phosphorus-containing carbon quantum dot with the maximum emission wavelength in the visible light range facilitates the use of the composition according to an embodiment of the present invention in various applications. The maximum emission wavelength of the phosphorus-containing carbon quantum dot is determined depending on the composition of the phosphorus-containing carbon quantum dot (such as the content of phosphorus and the presence or absence of a heteroatom other than phosphorus), the size of the phosphorus-containing carbon quantum dot, the type of smectite, the average interlayer spacing of the smectites, and the like.

The height of the phosphorus-containing carbon quantum dot in a cross section when it is observed with an atomic force microscope (AFM) is preferably from 1 to 100 nm and more preferably from 1 to 80 nm. The phosphorus-containing carbon quantum dot with the size in the above range is likely to have sufficient characteristics of a quantum dot.

In addition, when the composition is in a solid state, the amount of the phosphorus-containing carbon quantum dot in the composition is preferably from 1 to 60 mass % and more preferably from 10 to 40 mass %. On the other hand, when the composition is in a liquid state, the amount of the phosphorus-containing carbon quantum dot in the solid content (components excluding the solvent) of the composition is preferably in the above range. The phosphorus-containing carbon quantum dot contained in the composition in the above range allows the composition to provide sufficient emission. Furthermore, the phosphorus-containing carbon quantum dot contained in the above range is less likely to aggregate in the composition and increases the stability of the composition.

Smectite

A smectite is a mineral having a stacked structure of a plurality of crystal layers in which an aluminum octahedral layer is sandwiched between two silicate tetrahedral layers and interlayer ions are present between the crystal layers. In the aluminum octahedral layer, aluminum may be substituted by magnesium, iron, or the like.

A smectite having such a structure has a property of being easily swollen with water or the like. Specific examples of the smectite include saponite, montmorillonite, hectorite, beidellite, nontronite, sauconite, and stevensite.

The smectite may be a natural product or an artificial product. In addition, the interlayer ion may be an alkali metal ion, an alkaline earth metal ion, an aluminum ion, an iron ion, an ammonium ion, or the like. Furthermore, the smectite may be modified with an organic material of various types and may be chemically modified, for example, with a quaternary ammonium salt compound or a quaternary pyridinium salt compound.

When the composition is in a solid state, the amount of the smectite in the composition is preferably from 40 to 99 mass % and more preferably from 60 to 90 mass %. On the other hand, when the composition is in a liquid state, the amount of the smectite in the solid content (components excluding the solvent) of the composition is preferably in the above range. With the amount of the smectite in the above range, the amount of the phosphorus-containing carbon quantum dot is relatively sufficiently large, providing a sufficient amount of emission. In addition, the smectite contained in the above range can sufficiently support the phosphorus-containing carbon quantum dot and facilitates good dispersibility of the phosphorus-containing carbon quantum dot.

Solvent

As described above, the composition may further contain a solvent. In this case, the phosphorus-containing carbon quantum dot and the smectite described above are dispersed in the solvent.

The type of solvent is appropriately selected according to the application of the composition. Such a solvent is any solvent that can uniformly disperse the phosphorus-containing carbon quantum dot and the smectite and is not particularly limited, and may be, for example, either a non-polar solvent or a polar solvent. Examples of the solvent include water, methanol, ethanol, hexane, toluene, chloroform, dimethylformamide, and dimethyl sulfoxide. The composition may contain only one solvent or may contain two or more solvents.

The amount of the solvent is appropriately selected according to the application of the composition, but when the composition is in a liquid state, typically, the solvent is preferably contained in approximately 70 to 99.99 mass % and more preferably contained in approximately 90 to 99.9 mass % in the composition.

Method for Preparing Composition

Examples of a method for preparing the composition containing the phosphorus-containing carbon quantum dot and the smectite include the following two methods. However, the method for preparing the composition is not limited to these methods.

(1) First Preparation Method

A first preparation method includes:

preparing a mixture of an organic compound having a reactive group, a phosphorus compound, and a smectite (mixture preparation); and heating the mixture to obtain the composition described above (heat treatment). The method produces a phosphorus-containing carbon quantum dot in the presence of a smectite. Thus, the method has advantages in that using the interlayer space of the smectite as a template facilitates the adjustment of the size of the phosphorus-containing carbon quantum dot and this is likely to increase the fluorescence quantum yield of the resulting composition. Each step will be described below.

(1-1) Mixture Preparation

In the mixture preparation, an organic compound having a reactive group, a phosphorus compound, and a smectite are mixed. The organic compound is any compound that has a reactive group and can produce a carbon quantum dot by carbonization and is not particularly limited. In the present specification, the "reactive group" is a group for causing polycondensation reaction or the like of the organic compound in the heat treatment described later and is a group contributing to formation of a main backbone of the phosphorus-containing carbon quantum dot. Some of these reactive groups may remain in the phosphorus-containing carbon quantum dot. Examples of the reactive group include a carboxy group, a hydroxy group, an epoxy group, an amide group, a sulfo group, and an amino group. The organic compound may contain a component that is to be a heteroatom other than the phosphorus atom (e.g., such as a boron atom, a sulfur atom, a silicon atom, or a fluorine atom) in the phosphorus-containing carbon quantum dot. In the mixture preparation, two or more organic compounds may be used. In this case, a plurality of organic compounds preferably has a group that is readily react to each other.

Examples of the organic compound having a reactive group include carboxylic acids, alcohols, phenols, amine compounds, and saccharides. The organic compound may be in a solid or liquid state at normal temperature.

The carboxylic acid is any compound having one or more carboxy groups in the molecule (however, except those corresponding to phenols, amine compounds, or saccharides). Examples of the carboxylic acid include monocarboxylic acids, such as formic acid, acetic acid, 3-mercaptopropionic acid, and α-lipoic acid; polyvalent carboxylic acids that are divalent or higher, such as oxalic acid, malonic acid, succinic acid, maleic acid, fumaric acid, itaconic acid, polyacrylic acid, (ethylenedithio)diacetic acid, thiomalic acid, and tetrafluoroterephthalic acid; and hydroxy acids, such as citric acid, glycolic acid, lactic acid, tartaric acid, malic acid, and 5-sulfosalicylic acid.

The alcohol is any compound having one or more hydroxy groups (however, except those corresponding to carboxylic acids, phenols, amine compounds, or saccharides). Examples of the alcohol include polyhydric alcohols, such as ethylene glycol, glycerol, erythritol, pentaerythritol, ascorbic acid, and polyethylene glycol.

The phenol is any compound having a structure in which a hydroxy group is attached to a benzene ring. Examples of the polyphenol include phenol, catechol, resorcinol, hydroquinone, phloroglucinol, pyrogallol, 1,2,4-trihydroxybenzene, gallic acid, tannin, lignin, catechin, anthocyanin, rutin, chlorogenic acid, lignan, and curcumin.

Examples of the amine compound include 1,2-phenylenediamine, 1,3-phenylenediamine, 1,4-phenylenediamine, 2,6-diaminopyridine, urea, thiourea, ammonium thiocyanate, ethanolamine, 1-amino-2-propanol, melamine, cyanuric acid, barbituric acid, folic acid, ethylenediamine, diethylenetriamine, triethylenetetramine, polyethyleneimine, dicyandiamide, guanidine, aminoguanidine, formamide, glutamic acid, aspartic acid, cysteine, arginine, histidine, lysine, glutathione, RNA, DNA, cysteamine, methionine, homocysteine, taurine, thiamine, N-[3-(trimethoxysilyl)propyl]ethylenediamine, and 4,5-difluoro-1,2-phenylenediamine.

Examples of the saccharide include glucose, sucrose, glucosamine, cellulose, chitin, and chitosan.

Among those described above, preferred is an organic compound that allows condensation reaction to proceed efficiently, and a preferred example include a carboxylic acid, a phenol, an amine compound, or a combination of a carboxylic acid and an amine compound.

On the other hand, examples of the phosphorus compound containing phosphorus include elemental phosphorus, phosphoric acid, phosphorus oxide, 1-hydroxyethane-1,1-diphosphonic acid, phytic acid, ammonium phosphate, diammonium hydrogen phosphate, ammonium dihydrogen phosphate, O-phosphorylethanolamine, phosphorus chloride, phosphorus bromide, triethyl phosphonoacetate, tetrakis(hydroxymethyl)phosphonium chloride, methyl phosphate, triethyl phosphite, O-phosphoserine, nitrilotris(methylenephosphonic acid), N,N,N',N'-ethylenediaminetetrakis(methylenephosphonic acid), adenosine 5'-triphosphate, 2-phosphonobutane-1,2,4-tricarboxylic acid, guanidine phosphate, and guanylurea phosphate. The phosphorus compound is preferably phosphoric acid, phosphorus oxide, or 1-hydroxyethane-1,1-diphosphonic acid in terms of reactivity and the like.

The phosphorus-containing carbon quantum dot may contain a heteroatom other than the phosphorus atom as described above, and in the present step, a compound containing an atom other than the phosphorus atom (e.g., such as nitrogen, boron, sulfur, silicon, or fluorine) (hereinafter also referred to as an "additional compound") may be mixed with the organic compound and the phosphorus compound.

Examples of the compound containing nitrogen include imidazole, 1,2,4-triazine, 1,3,5-triazine, 1,2,3-triazole, and 1,2,4-triazole in addition to the amine compounds described above.

Examples of the compound containing boron include elemental boron, boric acid, sodium tetraborate, boric oxide, trimethyl borate, triethyl borate, trioctadecyl borate, triphenyl borate, 2-ethoxy-4,4,5,5-tetramethyl-1,3,2-dioxaborolane, triethanolamine borate, 2,4,6-trimethoxyboroxine, 2,4,6-triphenylboroxine, tris(trimethylsilyl) borate, tris(2-cyanoethyl) borate, 3-aminophenylboronic acid, 2-anthratheneboronic acid, 9-anthratheneboronic acid, phenylboronic acid, 3,5-bis(trifluoromethyl)phenylboronic acid, 4,4'-biphenyldiboronic acid, 2-bromophenylboronic acid, 4-bromo-1-naphthaleneboronic acid, 3-bromo-2-fluorophenylboronic acid, 4-carboxyphenylboronic acid, 3-cyanophenylboronic acid, 4-cyano-3-fluorophenylboronic acid, 3,5-difluorophenylboronic acid, 4-(diphenylamino)phenylboronic acid, 3-fluorophenylboronic acid, 3-hydroxyphenylboronic acid, 4-mercaptophenylboronic acid, 1-naphthaleneboronic acid, 9-phenanthreneboronic acid, 1,4-phenylenediboronic acid, 1-pyreneboronic acid, 2-aminopyrimidine-5-boronic acid, 2-bromopyridine-3-boronic acid, 2-fluoropyridine-3-boronic acid, 4-pyridylboronic acid, quinoline-8-boronic acid, 4-aminophenylboronic acid pinacol, 3-hydroxyphenylboronic acid pinacol, 4-(4,4,5,5-tetramethyl-1,3,2-dioxaborolan-2-yl)pyridine, diboronic acid, sodium borohydride, sodium tetrafluoroborate, 1-ethyl-3-methylimidazolium tetrafluoroborate, boron trifluoride, and boron tribromide.

In addition, examples of the compound containing sulfur include sulfur, sodium thiosulfate, sodium sulfide, sodium sulfate, sulfuric acid, methanesulfonic acid, lignin sulfonic acid, p-toluenesulfonic acid, sulfanilic acid, and sodium hydrosulfide; examples of the compound containing silicon include tetrachlorosilane, 3-aminopropyltriethoxysilane, 1-(trimethylsilyl)imidazole, and tetraethoxysilane; and furthermore, examples of the compound containing fluorine include 2,2,3,3,4,4-hexafluoro-1,5-pentanediol diglycidyl ether, 2-(perfluorohexyl)ethanol, and sodium fluoride.

The mixing ratio of the organic compound, the phosphorus compound, and the additional compound is appropriately selected according to a desired phosphorus content or the amount of heteroatom other than phosphorus in the phosphorus-containing carbon quantum dot.

On the other hand, the smectite to be combined with the organic compound, the phosphorus compound, and the additional compound is the same as the smectite described above (the smectite contained in the composition). The smectite is preferably selected according to the type of reactive group contained in the organic compound, the type of phosphorus compound, and the desired maximum emission wavelength of the phosphorus-containing carbon quantum dot, that is, the desired particle size of the phosphorus-containing carbon quantum dot.

The average interlayer spacing of the smectite to be combined with the organic compound and the phosphorus compound is appropriately selected according to the molecular structure of the organic compound, the molecular structure of the phosphorus compound, the desired particle size of the phosphorus-containing carbon quantum dot, or the like but is preferably from 0.1 to 10 nm and more preferably from 0.1 to 8 nm. The average interlayer spacing of the smectite can be analyzed with an X-ray diffractometer or the like. The average interlayer spacing of the smectite refers to a spacing between the bottom surface of one of the adjacent crystal layers and the top surface of the other one of the adjacent crystal layers in the smectite. As described above, in the first preparation method, the phosphorus-containing carbon quantum dot is synthesized using the interlayer space of the smectite as a template. Thus, the smectite with an average interlayer spacing of 10 nm or less facilitates producing a phosphorus-containing carbon quantum dot with an emission wavelength in a desired range. On the other hand, with an average interlayer spacing of 0.1 nm or greater, parts of the organic compound and phosphorus compound are likely to enter interlayer space, which facilitates the formation of the phosphorus-containing carbon quantum dot using the interlayer space of the smectite as a template.

To adjust the average interlayer spacing of the smectite, the smectite may be swelled with water or a solvent of various types. Examples of the organic solvent include methanol, ethanol, hexane, toluene, chloroform, dimethylformamide, and dimethyl sulfoxide. The amount of the solvent in the mixture is preferably from 10 to 80 mass % and more preferably from 10 to 70 mass %. In addition, an acid-treated smectite can be used, the acid-treated smectite being formed by bringing the smectite into contact with an acid, such as hydrochloric acid, to substitute sodium ions between the layers with protons.

Here, the method of mixing the organic compound, the phosphorus compound, and the smectite, as well as the additional compound as necessary is any method that can uniformly mix them and is not particularly limited. For example, they may be mixed while being ground in a mortar, mixed while being pulverized with a ball mill or the like, or mixed by dissolving, blending, or dispersing them in water or an organic solvent. When the organic compound or the phosphorus compound itself is a liquid, other components may be dissolved, blended, or dispersed in the liquid organic or phosphorus compound and mixed. The mixture in a liquid state may be dried or may be used as is in the next step. From the viewpoint of preventing side reactions, the mixture is preferably in a solid state. More preferably, the organic compound, the phosphorus compound, and the smectite are mixed in a state where all are solid, which is presumed to allow parts of the organic compound and the phosphorus compound to enter the interlayer space of the smectite and subject adequate amount to the reaction. The interlayer space of the smectite is narrow, thus making it difficult to form an aggregate of the organic compound and making it easier to prepare carbon quantum dots with a uniform particle size.

In addition, the mixing ratio of the organic compound and phosphorus compound to the smectite is appropriately selected according to the desired content ratio of the phosphorus-containing carbon quantum dot to the smectite.

(1-2) Heat Treatment

The heat treatment is a step of heating the mixture described above to fire the organic compound, the phosphorus compound, and the like together with the smectite to obtain the composition containing the phosphorus-containing carbon quantum dot and the smectite. The method for heating the mixture is any method by which the organic compound, the phosphorus compound, and the like can be reacted to prepare the phosphorus-containing carbon quantum dot and is not particularly limited. Examples include a method by heating and a method by microwave irradiation.

When the mixture is heated, the heating temperature is preferably from 70 to 700° C., more preferably from 100 to 500° C., and even more preferably from 100 to 300° C. In addition, the heating time is preferably from 0.01 to 45 hours, more preferably from 0.1 to 30 hours, and even more preferably from 0.5 to 10 hours. The particle size and in turn the maximum emission wavelength of the resulting phosphorus-containing carbon quantum dot can be adjusted by the heating time. Furthermore, here, heating may be performed in a non-oxidizing atmosphere while an inert gas such as nitrogen is circulated.

In a case of microwave irradiation, the wattage is preferably from 1 to 1500 W and more preferably from 1 to 1000 W. In addition, the heating time with a microwave is preferably from 0.01 to 10 hours, more preferably from 0.01 to 5 hours, and even more preferably from 0.01 to 1 hour. The particle size and in turn the maximum emission wavelength of the resulting phosphorus-containing carbon quantum dot can be adjusted by the microwave irradiation time.

The heat treatment provides a composition in which the phosphorus-containing carbon quantum dot and the smectite are uniformly dispersed. Furthermore, here, the composition may be washed with an organic solvent and purified by removing an unreacted substance or a by-product. Furthermore, a solvent may be further added as necessary, and the phosphorus-containing carbon quantum dot and the smectite are dispersed in the solvent to form a composition in a liquid state.

(2) Second Method

A second method for preparing the composition described above includes:

preparing a mixture of an organic compound having a reactive group and a phosphorus compound (mixture preparation);

heating the mixture to obtain a phosphorus-containing carbon quantum dot containing phosphorus as a heteroatom (heat treatment); and mixing the phosphorus-containing carbon quantum dot and a smectite (composition preparation). In the method, after a phosphorus-containing carbon quantum dot is prepared, the phosphorus-containing carbon quantum dot is mixed with a smectite. Also in the method, thoroughly mixing the phosphorus-containing carbon quantum dot and the smectite enables the phosphorus-containing carbon quantum dots to be finely dispersed in the composition. Each step will be described below.

(2-1) Mixture Preparation

In the mixture preparation, an organic compound having a reactive group and a phosphorus compound containing phosphorus are mixed to prepare a mixture. At this time, a compound containing nitrogen, boron, sulfur, silicon, or fluorine (an additional compound) may be further mixed. The organic compound, the phosphorus compound, and the additional compound are the same as those used in the first method described above. In addition, the method of mixing the organic compound, the phosphorus compound, and the additional compound is any method that can uniformly mix them and is not particularly limited. For example, they may be mixed while being ground in a mortar, mixed while being pulverized with a ball mill or the like, or mixed by dissolving, blending, or dispersing them in water or an organic solvent. When the organic compound or the phosphorus compound itself is a liquid, other components may be dissolved, blended, or dispersed in the liquid organic or phosphorus compound and mixed. The mixture in a liquid state may be dried or may be used as is in the next step. From the viewpoint of preventing side reactions, the mixture is preferably in a solid state.

In addition, the mixing ratio of the organic compound, the phosphorus compound, and the additional compound is appropriately selected according to the amount of phosphorus or the amount of heteroatom other than phosphorus in the phosphorus-containing carbon quantum dot.

(2-2) Heat Treatment

The heat treatment is a step of heating the mixture prepared in the mixture preparation described above to react the organic compound, the phosphorus compound, and the like to form a phosphorus-containing carbon quantum dot. The method for heating the mixture is any method by which the organic compound, the phosphorus compound, and the like can be reacted to prepare the phosphorus-containing carbon quantum dot and is not particularly limited. Examples include a method by heating and a method by microwave irradiation. The method by heating and the method by microwave irradiation are the same as those in the heat treatment in the first preparation method.

(2-3) Composition Preparation

The phosphorus-containing carbon quantum dot obtained in the heat treatment described above and a smectite are mixed. This provides a composition in which the phosphorus-containing carbon quantum dot and the smectite are uniformly dispersed. The phosphorus-containing carbon quantum dot and the smectite may be mixed while being ground in a mortar, mixed while being pulverized with a ball mill or the like, or mixed by dispersing them in water or an organic solvent. In addition, the phosphorus-containing carbon quantum dot before mixing or the composition after mixing may be washed with an organic solvent and purified by removing an unreacted substance or a by-product. The mixture in a liquid state may be dried or may be used as is as the composition. Furthermore, a solvent may be further added as necessary, and the phosphorus-containing carbon quantum dot and the smectite are dispersed in the solvent to form a composition in a liquid state.

Applications

The composition containing the phosphorus-containing carbon quantum dot and the smectite described above exhibits good emission and is useful as a separating agent for separating a specific substance using a functional group contained in the phosphorus-containing carbon quantum dot. Thus, the composition can be used in various applications.

In addition, the application of the composition described above is not particularly limited, and the composition can be used according to the performance of the carbon quantum dot, for example, in solar cells, displays, security inks, quantum dot lasers, biomarkers, lighting materials, thermoelectric materials, photocatalysts, and separating agents for a specific substance.

EXAMPLES

Hereinafter, specific examples of the present invention will be described together with comparative examples, but the present invention is not limited to these.

Example 1

(1) Preparation of Composition

In a mortar were ground 0.1 g of saponite (Sumecton SA, available from Kunimine Industries Co., Ltd.), 0.015 g of phloroglucinol dihydrate, and 0.013 g of phosphorus (V) oxide. The mixture was placed in a screw-top test tube with an internal volume of 15 mL, and the screw-top test tube was sealed with a screw cap with a rubber packing. The screw-top test tube was then heated at 200° C. for 3 hours while nitrogen was circulated in the screw-top test tube, and a composition (complex) containing a phosphorus-containing carbon quantum dot and saponite (smectite) was prepared.

(2) Evaluation of Emission Properties

The composition obtained above was sandwiched in KBr plates and pressed, and a measurement sample was prepared. The emission wavelength (maximum emission wavelength) and fluorescence quantum yield of the measurement sample in a solid state were evaluated using a spectrofluorometer FP-8500 (available from JASCO Corporation) equipped with an integrating sphere unit ILF-835. Light with a wavelength at which the fluorescence quantum yield of the composition was maximized was used as the excitation light.

Example 2

In a mortar were ground 1.0 g of saponite, 0.15 g of phloroglucinol dihydrate, and 0.091 g of phosphoric acid. The mixture was placed in a screw-top test tube with an internal volume of 15 mL, and the screw-top test tube was sealed with a screw cap with a rubber packing. The screw-top test tube was then heated at 200° C. for 3 hours while nitrogen was circulated in the screw-top test tube, and a composition (complex) containing a phosphorus-containing carbon quantum dot and saponite (smectite) was prepared. The emission properties of the prepared composition were evaluated in the same manner as in Example 1.

Evaluation of Layered Clay Mineral Content

Elemental analysis of the composition was performed using an X-ray fluorescence spectrometer ZSX Primus IV (available from Rigaku Corporation). The intensity of the peak originating from silicon in 0.1 g of the composition and the peak of the peak originating from silicon in 0.1 g of saponite used as the raw material were compared and the layered clay mineral content in the composition was evaluated. The results are shown in Table 2.

Example 3

In a mortar were ground 0.1 g of saponite, 0.04 g of phloroglucinol dihydrate, and 0.035 g of phosphorus (V) oxide. The mixture was placed in a screw-top test tube with an internal volume of 15 mL, and the screw-top test tube was sealed with a screw cap with a rubber packing. The screw-top test tube was then heated at 200° C. for 3 hours while nitrogen was circulated in the screw-top test tube, and a composition (complex) containing a phosphorus-containing carbon quantum dot and saponite (smectite) was prepared. The emission properties of the prepared composition were evaluated in the same manner as in Example 1. In addition, a surface functional group was evaluated by the following method.

Evaluation of Surface Functional Group

The sample and potassium bromide were pulverized, diluted and mixed, and pressed to form a potassium bromide tablet. The infrared absorption spectrum of the potassium bromide tablet was measured using a Fourier transform infrared spectrometer FT/IR-4100 (available from JASCO Corporation). The resulting infrared absorption spectrum is shown in FIG. 1.

Example 4

In a mortar were ground 0.1 g of saponite, 0.015 g of phloroglucinol dihydrate, 0.013 g of phosphorus (V) oxide, and 0.0057 g of boric acid. The mixture was placed in a screw-top test tube with an internal volume of 15 mL, and the screw-top test tube was sealed with a screw cap with a rubber packing. The screw-top test tube was then heated at 200° C. for 3 hours while nitrogen was circulated in the screw-top test tube, and a composition (complex) containing a phosphorus-containing carbon quantum dot and a layered clay mineral was prepared. The emission properties of the prepared composition were evaluated in the same manner as in Example 1. In addition, the layered clay mineral content in the composition was evaluated in the same manner as in Example 2. The results are shown in Table 2.

Example 5

In a mortar were ground 0.1 g of saponite, 0.01 g of 2,6-diaminopyridine, 0.01 g of resorcinol, and 0.013 g of phosphorus (V) oxide. 2,6-diaminopyridine recrystallized using acetone and chloroform was used. The mixture was placed in a screw-top test tube with an internal volume of 15 mL, and the screw-top test tube was sealed with a screw cap with a rubber packing. The screw-top test tube was then heated at 200° C. for 3 hours while nitrogen was circulated in the screw-top test tube, and a carbon quantum dot-containing composition (complex) containing a phosphorus-containing carbon quantum dot and saponite (smectite) was prepared. The emission properties of the prepared composition were evaluated in the same manner as in Example 1.

Example 6

In a mortar were ground 0.08 g of phloroglucinol dihydrate, 0.01 g of dicyandiamide, and 0.007 g of phosphoric acid. The mixture was placed in a screw-top test tube with an internal volume of 15 mL, and the screw-top test tube was sealed with a screw cap with a rubber packing. The screw-top test tube was then heated at 200° C. for 10 minutes while nitrogen was circulated in the screw-top test tube, and a phosphorus-containing carbon quantum dot was synthesized. Then, 0.01 g of the synthesized phosphorus-containing carbon quantum dot was weighed and mixed with 0.09 g of saponite by grinding both in a mortar, and a composition containing a phosphorus-containing carbon quantum dot and saponite (smectite) was obtained. The emission properties of the prepared composition were evaluated in the same manner as in Example 1. In addition, the layered clay mineral content in the composition was evaluated in the same manner as in Example 2. The results are shown in Table 2.

Example 7

In 250 mL of ion-exchanged water, 5.0 g of saponite (Sumecton SA, available from Kunimine Industries Co., Ltd.) was dispersed, and hydrochloric acid was added under stirring to adjust the pH to 4. The aqueous dispersion was allowed to stand for 3 days. The aqueous dispersion was then centrifuged at 1300 rpm for 10 minutes, the resulting gel-like solid was redispersed in ion-exchanged water, and centrifuged again. This operation was repeated. The collected gel-like solid was dried under vacuum at 90° C., and a white solid (hereinafter referred to as an acid-treated saponite) was obtained.

In a mortar were ground 0.1 g of the acid-treated saponite described above, 0.015 g of phloroglucinol dihydrate, and 0.065 g of phosphorus (V) oxide. The mixture was placed in a screw-top test tube with an internal volume of 15 mL, and the screw-top test tube was sealed with a screw cap with a rubber packing. The screw-top test tube was then heated at 200° C. for 3 hours while nitrogen was circulated in the screw-top test tube, and a composition (complex) containing a phosphorus-containing carbon quantum dot and the acid-treated saponite was prepared. The emission properties of the prepared composition were evaluated in the same manner as in Example 1.

Comparative Example 1

In a mortar were ground 0.15 g of phloroglucinol dihydrate and 0.06 g of phosphorus (V) oxide. The mixture was placed in a screw-top test tube with an internal volume of 15 mL, and the screw-top test tube was sealed with a screw cap with a rubber packing. The screw-top test tube was then heated at 200° C. for 3 hours while nitrogen was circulated in the screw-top test tube, and a phosphorus-containing carbon quantum dot was synthesized. The emission properties of the prepared phosphorus-containing carbon quantum dot were evaluated in the same manner as in Example 1.

Comparative Example 2

In a mortar were ground 0.15 g of phloroglucinol dihydrate and 0.091 g of phosphoric acid. The mixture was placed in a screw-top test tube with an internal volume of 15 mL, and the screw-top test tube was sealed with a screw cap with a rubber packing. The screw-top test tube was then heated at 200° C. for 3 hours while nitrogen was circulated in the screw-top test tube, and a phosphorus-containing carbon quantum dot was synthesized. The emission properties of the prepared phosphorus-containing carbon quantum dot were evaluated in the same manner as in Example 1.

Comparative Example 3

In a mortar were ground 1.0 g of saponite and 0.15 g of phloroglucinol dihydrate. The mixture was placed in a screw-top test tube with an internal volume of 15 mL, and the screw-top test tube was sealed with a screw cap with a rubber packing. The screw-top test tube was then heated at 200° C. for 3 hours while nitrogen was circulated in the screw-top test tube, and a carbon quantum dot-containing composition (complex) containing a carbon quantum dot and saponite (smectite) was prepared. The emission properties of the prepared composition were evaluated in the same manner as in Example 1.

Comparative Example 4

In a mortar were ground 0.1 g of hydrotalcite, 0.03 g of citric acid, 0.02 g of dicyandiamide, and 0.055 g of phosphorus (V) oxide. The mixture was placed in a screw-top test tube with an internal volume of 15 mL, and the screw-top test tube was sealed with a screw cap with a rubber packing. The screw-top test tube was then heated at 170° C. for 1.5 hours while nitrogen was circulated in the screw-top test tube, and a composition (complex) containing a phosphorus-containing carbon quantum dot and a layered clay mineral was prepared. The emission properties of the prepared composition were evaluated in the same manner as in Example 1.

Comparative Example 5

In a mortar were ground 0.5 g of hydrotalcite, 0.15 g of citric acid, and 0.1 g of dicyandiamide. The mixture was placed in a screw-top test tube with an internal volume of 15 mL, and the screw-top test tube was sealed with a screw cap with a rubber packing. The screw-top test tube was then heated at 170° C. for 1.5 hours while nitrogen was circulated in the screw-top test tube, and a composition (complex) containing a carbon quantum dot and a layered clay mineral was prepared. The emission properties of the prepared composition were evaluated in the same manner as in Example 1.

Comparative Example 6

In a mortar were ground 1.0 g of saponite, 0.01 g of 2,6-diaminopyridine, and 0.01 g of resorcinol. 2,6-diaminopyridine recrystallized using acetone and chloroform was used. The mixture was placed in a screw-top test tube with an internal volume of 15 mL, and the screw-top test tube was sealed with a screw cap with a rubber packing. The screw-top test tube was then heated at 200° C. for 3 hours while nitrogen was circulated in the screw-top test tube, and a composition (complex) containing a carbon quantum dot and saponite (smectite) was prepared. The emission properties of the prepared composition were evaluated in the same manner as in Example 1.

Comparative Example 7

In a mortar were ground 0.08 g of phloroglucinol dihydrate and 0.01 g of dicyandiamide. The mixture was placed in a screw-top test tube with an internal volume of 15 mL, and the screw-top test tube was sealed with a screw cap with a rubber packing. The screw-top test tube was then heated at 200° C. for 10 minutes while nitrogen was circulated in the screw-top test tube, and a carbon quantum dot was synthesized. Then, 0.01 g of the synthesized carbon quantum dot was weighed and mixed with 0.09 g of saponite by grinding both in a mortar, and a composition was obtained. The emission properties of the prepared composition were evaluated in the same manner as in Example 1.

Comparative Example 8

In a screw-top test tube with an internal volume of 15 mL, 1.0 g of saponite was impregnated with 0.15 g of furfuryl alcohol (liquid), and the screw-top test tube was sealed with a screw cap with a rubber packing. The screw-top test tube was then heated at 200° C. for 3 hours while nitrogen was circulated in the screw-top test tube, and a carbon quantum dot-containing composition (complex) containing a carbon quantum dot and a layered clay mineral was prepared. The emission properties of the prepared composition were evaluated in the same manner as in Example 1.

TABLE 1

| | Carbon quantum dot (raw material) | Layered clay mineral | Mixing method | Maximum emission wavelength | Solid-state emission quantum yield | Excitation wavelength |
|---|---|---|---|---|---|---|
| Example 1 | Phosphorus-containing carbon quantum dot (phloroglucinol + phosphorus oxide) | Saponite | Added before heat treatment | 581 nm | 15% | 540 nm |
| Example 2 | Phosphorus-containing carbon quantum dot (phloroglucinol + phosphoric acid) | Saponite | Added before heat treatment | 573 nm | 9% | 540 nm |
| Example 3 | Phosphorus-containing carbon quantum dot (phloroglucinol + phosphorus oxide) | Saponite | Added before heat treatment | 604 nm | 6% | 560 nm |
| Example 4 | Phosphorus-containing carbon quantum dot (phloroglucinol + phosphorus oxide + boric acid) | Saponite | Added before heat treatment | 567 nm | 7% | 500 nm |
| Example 5 | Phosphorus-containing carbon quantum dot (2,6-diaminopyridine + resorcinol + phosphorus oxide) | Saponite | Added before heat treatment | 550 nm | 8% | 500 nm |
| Example 6 | Phosphorus-containing carbon quantum dot (phloroglucinol + dicyandiamide + phosphoric acid) | Saponite | Added after heat treatment | 607 nm | 3% | 560 nm |
| Example 7 | Phosphorus-containing carbon quantum dot (phloroglucinol + phosphorus oxide) | Acid-treated saponite | Added before heat treatment | 610 nm | 7% | 560 nm |
| Comparative Example 1 | Phosphorus-containing carbon quantum dot (phloroglucinol + phosphorus oxide) | — | — | No emission | — | — |
| Comparative Example 2 | Phosphorus-containing carbon quantum dot (phloroglucinol + phosphoric acid) | — | — | No emission | — | — |
| Comparative Example 3 | Carbon quantum dot (phloroglucinol) | Saponite | Added before heat treatment | 543 nm | 3% | 440 nm |

TABLE 1-continued

|  | Carbon quantum dot (raw material) | Layered clay mineral | Mixing method | Maximum emission wavelength | Solid-state emission quantum yield | Excitation wavelength |
|---|---|---|---|---|---|---|
| Comparative Example 4 | Phosphorus-containing carbon quantum dot (citric acid + dicyandiamide + phosphorus oxide) | Hydrotalcite | Added before heat treatment | 488 nm | 7% | 400 nm |
| Comparative Example 5 | Carbon quantum dot (citric acid + dicyandiamide) | Hydrotalcite | Added before heat treatment | 487 nm | 10% | 400 nm |
| Comparative Example 6 | Carbon quantum dot (2,6-diaminopyridine + resorcinol) | Saponite | Added before heat treatment | 513 nm | 7% | 480 nm |
| Comparative Example 7 | Carbon quantum dot (phloroglucinol + dicyandiamide) | Saponite | Added after heat treatment | 478 nm | <1% | 400 nm |
| Comparative Example 8 | Carbon quantum dot (furfuryl alcohol) | Saponite | Added before heat treatment | No emission | — | — |

TABLE 2

|  | Carbon quantum dot (raw material) | | Layered clay mineral | |
|---|---|---|---|---|
|  | Type | Content | Type | Content |
| Example 2 | Phosphorus-containing carbon quantum dot (phloroglucinol + phosphoric acid) | 13 wt. % | Saponite | 87 wt. % |
| Example 4 | Phosphorus-containing carbon quantum dot (phloroglucinol + phosphorus oxide + boric acid) | 14 wt. % | Saponite | 86 wt. % |
| Example 6 | Phosphorus-containing carbon quantum dot (phloroglucinol + dicyandiamide + phosphoric acid) | 10 wt. % | Saponite | 90 wt. % |

As shown in Table 1 above, in Examples 1 to 7 containing a phosphorus-containing carbon quantum dot and a smectite, the maximum emission wavelength exceeded 550 nm, and furthermore, the solid-state emission quantum yield was 3% or higher, regardless of the mixing method for the phosphorus-containing carbon quantum dot and the smectite.

Here, Comparative Examples 4 and 5 are identical except for whether the carbon quantum dot contains phosphorus as a heteroatom. In both Comparative Examples 4 and 5, the compositions contain no smectite. In comparison of these results, the emission quantum yield was higher in the composition containing no phosphorus (Comparative Example 5). In addition, no significant change was observed in the maximum emission wavelength. That is, it can be said that lengthening the maximum wavelength and increasing the emission quantum yield are difficult for the carbon quantum dot merely containing phosphorus as a heteroatom.

On the other hand, Examples 1 to 3 and Comparative Example 3 are identical except for whether the carbon quantum dot contains phosphorus as a heteroatom. These all contain a smectite (saponite). In comparison of these results, the maximum emission wavelength was significantly lengthened in Examples 1 to 3 containing phosphorus. In addition, similar results were also obtained in comparisons of Example 5 with Comparative Example 6 as well as Example 6 with Comparative Example 7, which were likewise identical except for whether the carbon quantum dot contained phosphorus as a heteroatom. The above results reveals that the maximum wavelength can be lengthened for the first time when the composition is prepared by mixing the phosphorus-containing carbon quantum dot and the smectite. Furthermore, the solid-state emission quantum yield also improved in the compositions containing the phosphorus-containing carbon quantum dot and the smectite.

In addition, in comparison of Example 1 with Comparative Example 1, which was similar to Example 1 except for containing no saponite, the solid-state emission quantum yield was very high with 15% in Example 1 while no emission was observed in Comparative Example 1. Similar results were also obtained in comparison of Example 2 with Comparative Example 2, which was likewise similar to Example 2 except for containing no saponite.

Furthermore, no emission was observed in a composition prepared by mixing and heating saponite and a liquid organic compound (Comparative Example 8).

As shown in FIG. 1, in an infrared absorption spectrum of the composition prepared in Example 3, absorption peaks were observed at 1155 $cm^{-1}$, 1242 $cm^{-1}$, and 1458 $cm^{-1}$. These are considered to originate from a phosphorylated C—O bond, a P=O bond, and an aromatic ring to which phosphorus is attached. From this, it can be said that the phosphorus-containing carbon quantum dot in the composition prepared in Example 3 has a phosphoric acid ester structure or a phosphonic acid ester structure as a surface functional group.

Furthermore, in Examples 2, 4, and 6, the amount of smectite (saponite) was from 40 to 99 mass % relative to the amount of the composition as shown in Table 2, and the solid-state emission quantum yield was high in all these examples.

The present application claims priority to JP 2020-088999 filed on May 21, 2020. The contents described in the specification of this application are all incorporated in the specification of the present application.

INDUSTRIAL APPLICABILITY

The composition according to an embodiment of the present invention has a relatively long maximum emission wavelength and provides good solid-state emission quantum efficiency. Thus, the composition can be used in various applications.

The invention claimed is:

1. A method of producing a composition, the method comprising:
    preparing a solid mixture of a solid organic compound having a reactive group, a solid phosphorus compound, and a solid smectite; and
    heating the mixture in a solid state to obtain a composition containing:
    a phosphorus-containing carbon quantum dot containing phosphorus as a heteroatom, and
    a smectite.

2. A method of producing a composition, the method comprising:
    preparing a solid mixture of a solid organic compound having a reactive group and a solid phosphorus compound;
    heating the mixture in a solid state to obtain a phosphorus-containing carbon quantum dot containing phosphorus as a heteroatom; and
    mixing the phosphorus-containing carbon quantum dot and a smectite in a solid state.

* * * * *